United States Patent Office 3,031,446
Patented Apr. 24, 1962

3,031,446
BUTYROLACTONE DERIVATIVES
Hans Willi Zimmer, Cincinnati, Ohio, and James M. Holbert, Lookout Mountain, Tenn., assignors to The Chattanooga Medicine Company, Chattanooga, Tenn., a corporation of Tennessee
No Drawing. Filed July 14, 1958, Ser. No. 748,155
3 Claims. (Cl. 260—240)

The instant invention relates to novel organic compounds and a novel method of preparing the same, and more particularly, to novel butyrolactone derivatives and their preparation.

Although the compounds of the invention may have a number of uses in various fields they are particularly useful as pharmaceutical compounds and/or chemical intermediates in the synthesis of pharmaceutical compounds. The compounds of the invention may function as a uterine depressant and antispasmodic for smooth muscle.

In addition, the compounds of the invention may display antibacterial activity comparable to that of the well known sulfa drugs, sulfanilamide and sulfadiazine. In this respect, it should be noted that certain bacteria such as Streptococcus pyogenes, Micrococcus pyogenes, and Escherichia coli tend to become resistant to the known sulfa drugs, although they may be particularly sensitive to a new sulfa compound. It is believed that exposure of such bacteria to known sulfa drugs often tends to result in the survival of a strain resistant to such drugs, but still sensitive to a new drug to which the strain has not yet been exposed. There is thus a great need for new compounds which display antibacterial activity.

It is, therefore, an important object of the instant invention to provide new and useful butyrolactone derivatives.

It is another object of the instant invention to provide novel methods of producing such butyrolactone derivatives.

Other and further objects, features and advantages of the present invention will become apparent to those skilled in the art from the following detailed disclosure thereof.

The instant invention consists in a compound having the formula:

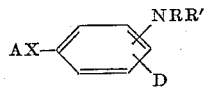

wherein X is a $C_1$–$C_4$ hydrocarbon group, R is a $C_1$–$C_4$ alkyl group, R' is selected from the group consisting of R and —$(CH_2)_nNR_2$ wherein $n$ is an integer from 1 to 3, D is selected from the group consisting of H and $C_1$–$C_4$ alkyl, and A is selected from the group consisting of

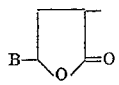

and

wherein B is selected from the group consisting of —H and —$CH_3$; and the invention also consists in the method of preparing such compound.

In general, the compounds of the invention are alpha substituted gamma-butyrolactones. The gamma-butyrolactone ring has the following formulae:

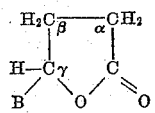

or

wherein B is H or $CH_3$. Strictly speaking the compound is gamma-valerolactone when B is $CH_3$, but this compound is also gamma-(methyl)-gamma-butyrolactone. The compounds of the invention are substituted at the alpha position on the butyrolactone ring.

The compounds of the instant invention are alpha substituted butyrolactones wherein the alpha substituent comprises a benzene ring connected to the butyrolactone ring by an aliphatic chain and the substituent contains no atoms other than carbon and hydrogen, except nitrogen in a tertiary amine group wherein the nitrogen atom is attached to the benzene nucleus and has two $C_1$–$C_4$ alkyl groups attached thereto.

Certain alpha substituted butyrolactones, and their methods of preparation, are known. For example, Losanitsch (Monatsh, 35, 311, 1914) discloses alpha-(benzal)-gamma-valerolactone:

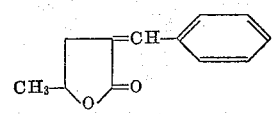

German Patent No. 844,292 of 1944 discloses alpha-(benzal)-gamma-butyrolactone:

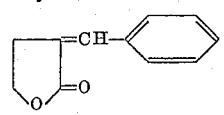

which is now a commercially available compound. The German patent discloses the condensation of butyrolactone with benzaldehyde to produce the above compound and further discloses the hydrogenation thereof to produce alpha-(benzyl)-gamma-butyrolactone:

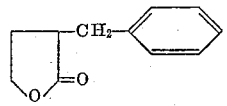

It has been found that the condensation reaction of the German patent is not operative with such compounds as p-aminobenzaldehyde, o-aminobenzaldehyde and m-aminobenzaldehyde. We have found, however, that the condensation of butyrolactone can be carried out successfully using N,N-dialkylaminobenzaldehydes. The resulting products may be hydrogenated at the alpha-exo double bond.

EXAMPLE 1

The apparatus used consists of a 500 milliliter three neck flask fitted with a stirrer, reflux condenser, thermometer and nitrogen inlet tube. A charge of 0.1 mol of p-dimethylaminobenzaldehyde and 0.2 mol of butyrolactone is dissolved in 100 ml. of benzene. With stirring, the reaction mixture is cooled down to approximately 0° C. in an ice-salt bath; and an atmosphere of nitrogen is maintained over the reaction mixture. Over a period of about 15 minutes, 0.15 mol of sodium methylate is added to the reaction mixture incrementally. With continued stirring and cooling, the reaction mixture reaches approximately room temperature and tends to gel, whereupon an additional 100 ml. of benzene is added, and stirring is continued for an hour. Then the reaction mixture is heated in a water bath for 30 minutes at 60–65° C. and allowed to stand overnight. Next, sufficient 10% aqueous sulfuric acid is added with stirring to make the reaction mixture acidic; and stirring is continued for 1 hour and the precipitate which is formed is filtered and washed throughly with water. This precipitate is recrystallized from dioxane. The resulting alpha-(p-dimethylaminobenzal)-butyrolactone is in the form of yellow crystals melting at 195–196° C. Elemental analysis calculated for $C_{13}H_{15}NO_2$ is N=6.45; and found: N=6.33. This compound produces a uterine sedative action of about one-half of that of papaverine.

A charge of 5 grams of alpha-(p-dimethylaminobenzal)-butyrolactone is added to 250 milliliters of methanol, to which is also added 0.5 gram of platinum dioxide, in a Parr apparatus, which is shaken under 45–50 pounds of hydrogen until the pressure remains constant. The catalyst is then removed by filtration, and the solvent distilled off. The product may be recrystallized. The instant product is alpha-(p-dimethylaminobenzyl)-butyrolactone, in the form of white crystals melting at 92° C. Elemental analysis for the instant product calculated for $C_{13}H_{17}NO_2$ is C=71.20, H=7.81; and found: C=71.08 and H=7.72. This compound exhibits a uterine sedative action of about $\frac{1}{20}$ of that of papaverine.

EXAMPLE 2

A procedure is carried out that is the same as that of Example 1 except that the aldehyde used is p-diethylaminobenzaldehyde, the reaction time before heating in the water bath is 2 hours instead of 1 hour, and the product is recrystallized from ethanol; and the resulting product is alpha-(p-diethylaminobenzal)-butyrolacetone in the form of yellow crystals melting at 126–128° C. This compound exhibits a uterine sedative action of $\frac{1}{5}$ of that of papaverine. Elemental analysis for this compound calculated for $C_{15}H_9NO_2$ is N=5.71; and found: N=5.61.

The aforementioned hydrogenation procedure is also carried out and the resulting product: alpha-(p-diethylaminobenzyl)-butyrolactone is an amber liquid boiling at 173–174° C. at 4 mm. Hg. This compound exhibits a uterine sedative action of $\frac{1}{20}$ of that of papaverine.

Alpha - (p - diethylaminobenzal) - butyrolactone hydrochloride is prepared by reacting the instant butyrolactone with an equimolar proportion of hydrochloric acid and, after several recrystallizations from 95% aqueous ethanol, the product is a white amorphous material melting with decomposition at 203–204° C. Analysis calculated for $C_{15}H_{20}ClNO_2$ is Cl=12.58; and found: Cl=12.27. This compound exhibits a uterine sedative action of about $\frac{1}{5}$ of that of papaverine.

EXAMPLE 3

A procedure is carried out that is the same as that of Example 1 except that o-dimethylaminobenzaldehyde or m-dimethylaminobenzaldehyde is used and the corresponding alpha-(o-dimethylaminobenzal)-butyrolactone or alpha-(m-dimethylaminobenzal)-butyrolactone is obtained. The compound alpha-(o-diethylaminobenzal)-butyrolactone is also obtained by carrying out the instant procedure using, as a starting material, o-diethylaminobenzaldehyde; and alpha - (m - diethylaminobenzal) - butyrolactone is obtained by reaction of the corresponding aldehyde.

In like manner, the ethylmethylamino-, dipropylamino-, dibutylamino-, and the like derivatives are obtained. Each of these compounds may be hydrogenated by the procedure of Example 1 (to change them from a benzal derivative to a benzyl derivative).

EXAMPLE 4

A procedure is carried out that is the same as that of Example 1 except that the aldehyde used is p-dimethylaminocinnamaldehyde and the resulting product is alpha-(p-dimethylaminocinnamal)-butyrolactone in the form of orange-red crystals melting at 181–182° C. This compound exhibits a uterine sedative action of about $\frac{1}{10}$ of that of papaverine and exhibits antibacterial activity with respect to *Streptococcus pyogenes*.

The hydrogenated product, alpha-(3-(p-dimethylaminophenyl-1-propyl))-butyrolactone is in the form of a yellowish oil having a melting point of about 35° C. and boiling at 187° C. at 4 mm. Hg. This compound exhibits a uterine sedative action of approximately $\frac{1}{10}$ of that of papaverine.

Corresponding butyrolactone derivatives are obtained by carrying out the procedure just described using o-dimethylamino - p - methylbenzaldehyde, o - methyl - p - diethylaminobenzaldehyde, o - dimethylamino - p - isopropylbenzaldehyde, p - dimethylaminophenylacetaldehyde, and o - dimethylaminophenylpropionaldehyde.

In addition, valerolactone homologues of each of the foregoing butyrolactone derivatives are obtained by carrying out the described procedure using gamma-valerolactone in place of the butyrolactone.

EXAMPLE 5

Besides the dialkylaminobenzaldehydes and the like compounds, aromatic aldehyde compounds may be used in the practice of the instant invention containing, as a nuclear substituent, the radical $-NR-(CH_2)_nNR_2$. Such aldehydes include p-(N-dimethylaminoethyl-N-methylamino)benzaldehyde, m - (N - diethylaminopropyl - N-methylamino)benzaldehyde, p-(N-dimethylaminoethyl-N-methylamino)cinnamaldehyde, and o-(N-diethylaminoethyl - N - methylamino)phenylpropionaldehyde. Better yields of these compounds are obtained, however, by using a stepwise synthesis, which involves first nitrating a simple aromatic aldehyde such as benzaldehyde, followed by conversion of the nitro group to an amino group, and then followed by replacement of one of the amino H's with an alkyl group by reaction with a simple alkyl chloride and replacement of the other amino H by reaction with the compound: $Cl(CH_2)_nNR_2$, wherein the letters have the designations already set forth in this disclosure. In other words, small $n=1$ to 3 and R is the same or different $C_1$–$C_4$ alkyl group in each case. The remainder of the instant disclosure is devoted to this sequence of nitration, amination and alkylation.

*Nitration*

The first step in the practice of the method of the instant invention is the low temperature nitration of a starting material having the following formula:

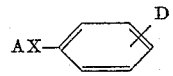

wherein X is a $C_1$–$C_4$ hydrocarbon group, D is H or $C_1$–$C_4$ alkyl, and A is selected from the following:

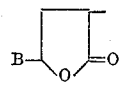

and

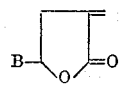

As previously mentioned, Losanitsch and German Patent No. 844,292 disclosed alpha-(benzal)-valerolactone, alph-(benzal)-butyrolactone and alpha-(benzyl)-butyrolactone.

Although the other starting materials are new compounds, we have found that these other compounds may be prepared by carrying out the reactions described by Losanitsch and the German patent. For example, the apparatus used consists of a 500 milliliter three neck flask fitted with a stirrer, reflux condenser, thermometer and nitrogen inlet tube. A charge of 0.1 mol of p-tolyl aldehyde and 0.2 mol of butyrolactone dissolved in 100 ml. of benzene is added to the flask and, under stirring, cooled down to 3° C. by means of an ice bath. Nitrogen is passed over the reaction mixture; and over a period of 15 minutes 0.25 mol of sodium methylate is added incrementally. The temperature rises to 27° C. and the mixture becomes a brownish jelly, which is then diluted with 100 ml. of additional benzene. Stirring is continued for 3 more hours, then the mixture is heated at 60–65° C. on a water bath for 45 minutes. After standing overnight, sufficient 10% aqueous sulfuric acid is added under stirring to make the reaction mixture acidic; stirring is continued for 1 hour and the precipitate which has formed is separated on a suction filter and washed thoroughly with water. The yield was 46% of material having a melting point of 63–64° C. (after recrystallization from ethanol). Analysis for the product calculated for $C_{12}H_{12}O_2$ is C=76.57 and H=6.43; found: C=76.56 and H=6.43.

The same procedure is repeated using p-isopropyl benzaldehyde in place of the p-tolyl aldehyde and the resulting product has a melting point of 65–66° C. and is obtained in a yield of 62% after recrystalization from ethanol and petroleum ether. Analysis for this product calculated for $C_{14}H_{16}O_2$ is C=77.74 and H=7.46; found: C=76.63 and H=7.67.

The same procedure is repeated using cinnamaldehyde in place of the other aldehydes and the resulting product, after crystallization from methanol, has a melting point of 133.5–135° C., being obtained in a yield of 67%. Analysis for the product calculated for $C_{13}H_{12}O_2$ is C=77.98 and H=6.04; found: C=77.73 and H=6.26.

The same procedure is used to prepare gamma-valerolactone derivatives of the aldehydes just mentioned. Also, gamma-valerolactone and gamma-butyrolactone derivatives are prepared by carrying out the procedure just described using p-ethylbenzaldehyde, p-isobutylbenzaldehyde, phenylacetaldehyde, phenylpropionaldehyde, and phenylbutyraldehyde.

In each of the aforementioned starting materials there is a double bond between the radical A and the radical X, although the radical X is a $C_1$–$C_4$ hydrocarbon group; and the radical D set forth in the generic formula for the starting material is H or a $C_1$–$C_4$ alkyl radical. The unsaturation between the radical A (or the butyrolactone ring) and the radical X is saturated by hydrogenation. For example, a charge of 5 grams of alpha-(4-methylbenzal)-butyrolactone is added to 258 milliliters of methanol, to which is also added 0.5 gram of platinum dioxide, in a Parr apparatus, which is shaken under 45–50 pounds of hydrogen until the pressure remains constant. The catalyst is then removed by filtration, and the solvent distilled off. The product may be recrystallized. The instant product is alpha-(4-methybenzyl)-butyrolactone obtained in a yield of 99% and having a boiling point of 135° C. at 4 mm. Hg; and analysis for the instant product calculated for $C_{12}H_{14}O_2$ is C=75.75 and H=7.43; found: C=75.83 and H=7.89.

The same procedure is carried out using alpha-(4-isopropylbenzal)-butyrolactone to obtain a yield of 92% of alpha-(4-isopropylbenzyl)-butyrolactone boiling at 138–140° C. at 5 mm. Hg; and analysis calculated for $C_{14}H_{18}O_2$ is C=77.03 and H=8.71; and found: C=76.69 and H=8.48.

The same procedure is carried out using alpha-cinnamal-butyrolactone to obtain alpha-(3-phenyl-1-propyl)-butyrolactone which is a colorless oily liquid.

The nitration of the instant starting material is carried out by subjecting the starting material to a nitrating agent at minus 10° C. to 10° C., and preferably 0° C. to 5° C., to substitute at least one nitro group on the benzene ring, according to Equation 1 below:

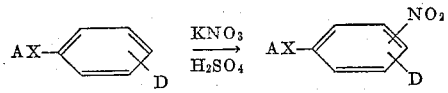

Using an excess of nitrating agent, small yields of a di- nitro compound are obtained and both of the nitro groups will undergo the reactions hereinafter described for only a single nitro group.

It is important to note that the condensations of nitrobenzaldehydes with butyrolactone, using the Losanitsch and the German patent processes, do not proceed satisfactorily. The o-nitrobenzaldehyde and p-nitrobenzaldehyde reactions give substantially no yield and the m-nitrobenzaldehyde reaction gives only a slight yield. It also would be expected that the reaction of Equation 1 above using, for example, alpha-(benzal)-butyrolactone would not proceed as indicated, because of the unsaturation in the side chain (connecting the benzal group with the alpha position of the butyrolactone ring). Instead, appreciable nitration at the ortho and para positions takes place using the reaction of Equation 1, with slight substitution at the meta position. In view of this, it can be assumed that the carbonium ion structures involved in the mechanism of the nitration are as indicated in Equation 2 below:

(2)
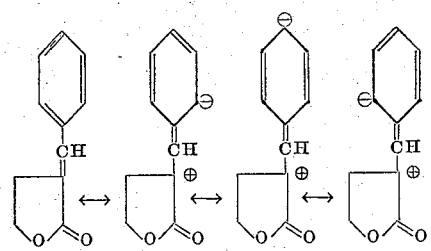

It is important to also control the nitration temperature, or the yield is substantially lost in the form of tars and other undesirable by-products. The nitrating agent used, so far as is known, may be any conventional nitrating agent, although strongly active nitrating agents would have to be added to the reaction mixture very slowly and carefully so that the critical temperature range is maintained. The nitrating agents which may be used include concentrated or fuming nitric acid, a concentrated sulfuric acid-nitric acid system and similar conventional nitrating agents; but preferably the nitrating agent used is a metal nitrate dissolved in concentrated sulfuric acid. The amount of metal nitrate used is the molar equivalent (up to about a 10% excess) of the amount of butyrolactone derivative to be nitrated and the metal nitrate is used in combination with about 5 to 20 times its weight of concentrated sulfuric acid (100.5%). Part of the total amount of concentrated sulfuric acid is ordinarily used to initially dissolve the butyrolactone derivative and the metal nitrate is dissolved in the remainder and added dropwise to the reaction mixture. The total concentrated sulfuric acid is approximately 10 times the total weight of the metal nitrate in the preferred reaction. If the substitution of two nitro groups is desired, the same reaction conditions are used except that twice as much metal nitrate is used. The preferred metal nitrate is potassium nitrate.

EXAMPLE 6

A charge of 0.3 mol of alpha-(benzal)-butyrolactone is dissolved in 180 ml. of concentrated sulfuric acid and the mixture is cooled by means of an ice-salt bath. With stirring, a solution of 0.33 mol of $KNO_3$ in 140 ml. of concentrated sulfuric acid is added dropwise over a period of an hour, during which time the internal temperature of the reaction mixture is held at 0° C. to 5° C. The reaction mixture is then kept for 3 more hours in the ice bath and finally poured onto ice. A slightly yellow precipitate results, which is filtered on a suction filter and thoroughly washed with water until the washings are neutral, then washed with cold methanol. This crude product is then treated briefly with 250 ml. of hot methanol and filtered hot; again washed with hot and cold methanol, and then with ether. This results in a yield of 40 grams (61%) of alpha-(p-nitrobenzal)-butyrolactone in the form of yellow crystals melting at 201–202° C. Analysis for alpha-(p-nitrobenzal)-butyrolactone calculated as $C_{11}H_9NO_4$ is C=60.27 and H=4.14; and found: C=60.02 and H=3.92. This compound produces a uterine sedative action of about ⅕ of that of papaverine.

The methanol filtrates of alpha-(p-nitrobenzal)-butyrolactone described in the foregoing paragraph are concentrated to yield, upon one recrystallization from methanol, 11.9 grams (or 18% yield) of alpha-(o-nitrobenzal)-butyrolactone in the form of yellowish-white crystals melting at 96–97° C. After two more recrystallizations from methanol, the melting point is 96–97.5° C. Analysis for alpha-(p-nitrobenzal)-butyrolactone calculated for $C_{11}H_9NO_4$ is C=60.27, H=4.14, N=6.39; and found: C=60.15, H=4.03, N=6.58.

Various amounts of alpha-(m-nitrobenzal)-butrolacetone are also obtained. This material has a melting point of 147–148° C.

EXAMPLE 7

The procedure of Example 6 is carried out except that the starting material used is alpha-(benzyl)-butyrolactone and the resulting products are alpha-(p-nitrobenzyl)butyrolactone, alpha - (o - nitrobenzyl) - butyrolactone and trace amounts of alpha-(m-nitrobenzyl)-butyrolactone. Corresponding para, ortho and meta nitro substituted compounds are obtained by carrying out the same procedure using alpha-(cinnamal)-butyrolactone or alpha-(3-phenyl-1-propyl)-butyrolactone.

The corresponding o-nitro substituted compounds of the invention are obtained by carrying out the process of Example 6 using alpha-(p-methylbenzyl)-butyrolactone, alpha-(p-methylbenzal)-butyrolacetone, alpha-(p-isopropylbenzal)- butyrolactone, and alpha-(p-isopropylbenzyl)-butyrolactone.

EXAMPLE 8

Using an apparatus consisting of a 500 ml. three neck flask fitted with a stirrer, reflux condenser, thermometer and nitrogen inlet tube, the flask is charged with 0.1 mol of m-nitrobenzaldehyde and 0.2 mol of butyrolactone dissolved in 100 cc. of benzene and, under stirring, cooled down to 3° C. by means of an ice-salt bath. Nitrogen is maintained over the reaction mixture. Over a period of 15 minutes, 0.15 mol of sodium methylate is added incrementally; and the temperature rises to about 30° C. and the mixture becomes a brownish jelly which is diluted with another 100 cc. of benzene; and stirring is continued for 1 more hour. Then the mixture is heated in a water bath for 1 hour at 60–65° C. After standing overnight, sufficient 10% aqueous sulfuric acid is added under stirring to make the mixture acidic; stirring is continued for 1 hour and the precipitate which has formed is filtered and washed thoroughly with water. The product obtained in a yield of only 15% is alpha-(m-nitrobenzal)-butyrolactone which, after recrystallization from methanol, at a melting point of 147–148° C. Analysis for alpha-(m-nitrobenzal)-butyrolactone calculated for $C_{11}H_9NO_4$ is C=60.2, H=4.14; and found: C=60.70, H=4.23.

Substantially no yield is obtained carrying out this same procedure using o-nitrobenzaldehyde or p-nitrobenzaldehyde.

The resulting nitration products used in the instant invention will thus have the following generic formula:

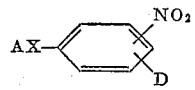

Amination

The conversion of the nitro group to an amino group in the instant butyrolactone derivatives is accomplished by subjecting the nitro derivative to an acidic metal halide reducing agent. The acid usually used is hydrochloric acid and the treatment with the acidic metal halide is followed by heat treatment with a suitable base such as ammonia to remove excess hydrochloric acid, so as to obtain the resulting amino butyrolactone derivative, rather than its hydrochloride. The metal halide reducing agent is preferably stannous chloride ($SnCl_2$), but it may be a halide of any metal whose atom exhibits two or more valencies (in plural stages of oxidation). The metal atom employed in the reducing agent is in a lower stage of oxidation, such as in stannous chloride; and during the reaction it is converted to a higher stage of oxidation such as in stannic chloride ($SnCl_4$). The metal atom thus picks up the acid anion and the acid H is free to substitute for the O's of the nitro group. This reaction is unique in that it does not involve direct hydrogenation which would affect the double bond connected to the alpha position of the butyrolactone ring. For example, alpha-(p-nitrobenzal)-butyrolactone may be converted to alpha-(p-aminobenzal)-butyrolactone by the instant reaction, according to Equation 3 below:

(3)
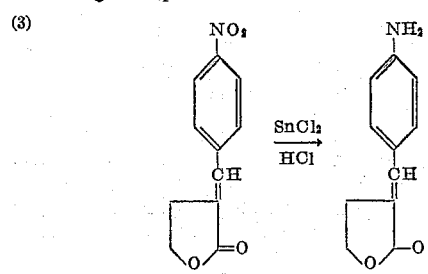

Generically, the reaction is represented by Equation 4 below:

(4)
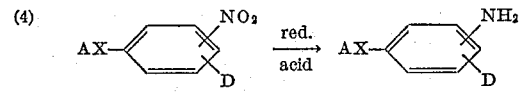

EXAMPLE 9

A charge of 0.0675 mol of alpha-(m-nitrobenzal)-butyrolactone is added to 0.4 mol of $SnCl_2.2H_2O$ dissolved in 225 ml. of HCl. Substantially the entire amount of the charge enters in the solution, and after a few minutes moderately exothermic reaction occurs and the mixture solidifies. After 24 hours standing at room temperature, the precipitate is filtered by suction and immediately added to 300 ml. of concentrated aqueous ammonia and stirred for several hours at room temperature. The residue is filtered again, washed thoroughly with water and dried over $P_2O_5$ at 5 mm. Hg. The resulting brown-yellowish powder is then extracted with chloroform in a Soxhlet apparatus for 24 hours until the residue does not contain any more organic material. This is apparent from the color, since the exhausted inorganic powder is brownish-gray and does not show any yellowish zones. The chloroform extract is evaporated to dryness and the resulting yellow residue recrystallized from methanol, yielding 9.3 grams of yellow leaflets melting at 164–165.5° C. Analysis for alpha-(p-aminobenzal)-butyrolactone calculated for $C_{11}H_{11}NO_2$ is C=69.82 and H=5.86; and found: C=69.73, H=6.05. This compound produces a uterine sedative action of about ⅒ that of papaverine.

Alpha-(m-aminobenzal)-butyrolactone.hydrochloride is prepared by reacting the instant butyrolactone with an equimolar proportion of hydrochloric acid, and after several recrystallizations from 95% aqueous ethanol, the product is a cream colored crystalline product decomposing at 237–240° C. Analysis calculated for $$C_{11}H_{12}ClNO_2$$

is C=58.53, H=5.36, N=6.21; and found: C=58.11, H=5.45, N=5.93.

Alpha-(m-aminobenzal)-butyrolactone is prepared by carrying out the reaction of the first paragraph of this example using, as a starting material, alpha-(m-nitrobenzyl)-butyrolactone; or by hydrogenating alpha-(m-aminobenzal)-butyrolactone in accordance with the following procedure: A charge of 5 grams of alpha-(m- aminobenzal)-butyrolactone is suspended in 250 ml. of methanol, to which is added 0.5 gram of platinum dioxide. This reaction mixture is shaken under 45–50 pounds of hydrogen pressure in a Parr apparatus until the pressure remains constant. The catalyst is removed by filtration, the solvent by distillation and the residue is recrystallized from methanol to obtain alpha-(m-aminobenzyl)-butyrolactone in the form of light tan crystals melting at 73.5–75° C.

The procedure of the foregoing paragraph is carried out by using, as a starting material, alpha-(p-nitrobenzal)-butyrolactone, and the corresponding products are obtained. For example, alpha-(p-aminobenzal)-butyrolactone is in the form of amber crystals melting at 194–195.5° C. Alpha-(p-aminobenzyl)-butyrolactone is in the form of light tan crystals melting at 84.5–85.5° C. Calculated N is 7.33 on the basis of $C_{11}H_3NO_2$ and elemental analysis establishes that N is 7.44.

EXAMPLE 10

A procedure is carried out that is the same as that of the foregoing example, except that the starting material is alpha-(o-nitrobenzal)-butyrolactone and the corresponding products are obtained. For example, alpha-(o-aminobenzal)-butyrolactone is obtained in the form of yellow crystals melting at 149–150° C. This material produces a uterine sedative action of about 1/20 of that of papaverine. Elemental analysis calculated for $C_{11}H_{11}NO_2$ is N=7.40; and found: N=7.47.

Alpha - (o-aminobenzal)-butyrolactone.hydrochloride thus prepared is in the form of pale yellow crystals melting at 198–199° C. and this compound produces a uterine sedative action of about 1/10 of that of papaverine. Elemental analysis calculated on the basis of $C_{11}H_2NO_2Cl$ is Cl=15.72; and found: Cl=15.72.

The corresponding amino derivatives are prepared by carrying out the procedure of the foregoing example using instead as nitro derivatives alpha-(2-nitro-4-methylbenzyl)-butyrolactone, alpha - (3-(p-nitrophenyl)-1-propyl)-butyrolactone, alpha - (2-nitro-4-methylbenzal) - butyrolactone, and alpha-(p-nitrocinnamal)-butyrolactone. Corresponding amino compounds are also obtained carrying out the instant procedure using as starting materials alpha - (2 - nitro - 4 - isopropylbenzyl) - butyrolactone and alpha-(2-nitro-4-isopropylbenzal)-butyrolactone.

The amino compounds of the invention thus have the following generic formula:

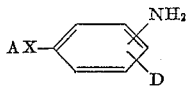

Alkylation

Substituted amines corresponding to the above specified compound (in the generic formula) may be prepared by reacting the desired alkyl chloride or the like compound. Preferably, one hydrogen of the amino group is satisfied by the $C_1-C_4$ alkyl group hereinbefore designated as the radical R; and the other hydrogen is replaced by the group —$(CH_2)_nNR_2$. Preferably, the substitution of the radical R for one of the amino H's is carried out first. In each case, however, the substitution for one of the amino H's is carried out in the presence of a suitable solvent and a base to assist in the removal of the hydrochloric acid formed by the reaction. The unsubstituted amino butyrolactone reactant is, of course, a base; but preferably an inexpensive base such as trimethylamine is employed. The amount of solvent used should be at least sufficient to dissolve the reactants and may range from 5 to 20 times the weight of the amino-butyrolactone derivative. A basic solvent such as pyridine may be used; but preferably an inert solvent such as ethanol or benzene is used in combination with 1 molar equivalent of the reactants of an amine base such as trimethylamine. At the end of the reaction, the reaction mixture is mixed with water in an amount sufficient to precipitate the product, preferably about an equal amount of water.

EXAMPLE 11

The primary amino group in, for example, alpha-(aminobenzal)-butyrolactone may be converted to a secondary amino group by reaction with an alkyl chloride such as ClR (wherein R has the definition already disclosed). For example, a charge of 0.1 mol of alpha-(p-aminobenzal)-butyrolactone, 0.1 mol of methyl chloride, 2 mols of methanol and 0.1 mol of trimethylamine is refluxed for 2 hours and the resulting mixture is poured into and equal volume of water from which alpha-(p-methylaminobenzal)-butyrolactone precipitates and is separated and dried. The corresponding ethyl, isopropyl, or butyl amine derivatives may be obtained by carrying out the same procedure using the specified alkyl chloride. Corresponding butyrolactone derivatives may be obtained using any of the aforementioned amino-butyrolactone derivatives, such as the compound having the formula:

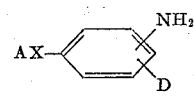

Compounds which may be used in the aforementioned reaction to form a secondary amino group include alpha-(m-aminobenzal)-butyrolactone, alpha-(m-aminobenzyl)-butyrolactone, alpha-(o-aminobenzyl)-butyrolactone, alpha-(p-aminobenzyl)-butyrolactone, alpha - (2-amino-4-isopropylbenzal)-butyrolactone, alpha - (p-aminocinnamal)-butyrolactone and the like.

EXAMPLE 12

A charge of 0.1 mol of alpha-(p-ethylaminobenzal)-butyrolactone, 0.1 mol of dimethylaminoethyl chloride, 2 mols of methanol and 0.1 mol of trimethylamine is refluxed for 2 hours and the resulting mixture is poured into an equal volume of water from which alpha-(p-(N-dimethylaminoethyl-N-ethylamino) - benzal) - butyrolactone precipitates and is separated and dried.

Alpha - (p - (N-dimethylaminoethyl-N-methylamino)-benzal)-butyrolactone is prepared by carrying out the foregoing procedure using as the butyrolactone starting material alpha - (p - methylaminobenzal) - butyrolactone. The corresponding diethylaminotrimethylene derivative is obtained using, as the starting chloride, diethylaminotrimethylene chloride. The corresponding dimethylaminomethyl derivative is obtained using, as the starting chloride material, dimethylaminomethyl chloride. Other butyrolactone derivatives of the invention are obtained using, as the butyrolactone starting material for this last step, alpha - (o-methylamino-p-methylbenzal)-butyrolactone, alpha-(o-methyl-p-ethylaminobenzal)-butyrolactone, alpha- (o-methylamino-p-isopropylbenzal)-butyrolactone, alpha-(p-methylaminocinnamal) - butyrolactone, and alpha-(o-ethyl-p-methylaminobenzyl)-butyrolactone.

It will also be appreciated that dialkylation can be carried out using the instant process sequence so as to obtain products of the invention. For example, alpha-(p-aminobenzal)-butyrolactone may be reacted with 2 molar equivalents of ethyl chloride in the reaction just described so as to obtain alpha-(p-diethylaminobenzal)-butyrolactone.

It will be understood that modifications and variations may be effected without departing from the spirit and scope of the novel concepts of the present invention.

We claim as our invention:
1. Alpha - (p - dimethylaminobenzal) - gamma - butyrolactone.
2. Alpha - (p - diethylaminobenzal) - gamma - butyrolactone.
3. Alpha-(p-dimethylamino - cinnamal)-gamma-butyrolactone.

(References on following page)

References Cited in the file of this patent

Losanitsch: Chem. Abst., 8, pages 2364–5 (1914).
Degering: "An Outline of Organic Nitrogen Compounds," page 295 under paragraph 905 and page 304 paragraph 942 (1945).
Degering: "An Outline of Organic Nitrogen Compounds," paragraphs 1454–1458 on pages 481–482 (1945).
Kondo et al.: Chem. Abst., 50, page 10043e (1956).
Groggins: "Unit Processes in Organic Chemistry," McGraw-Hill, page 1 (1947).